Jan. 13, 1970  D. S. BROWN  3,489,484
REFLECTING MEMBERS FOR OPTICAL INSTRUMENTS
Filed May 12, 1966

United States Patent Office 3,489,484
Patented Jan. 13, 1970

3,489,484
REFLECTING MEMBERS FOR OPTICAL
INSTRUMENTS
David Scatcherd Brown, Newcastle upon Tyne, England, assignor to Sir Howard Grubb Parsons & Company Limited, Newcastle upon Tyne, England, a British company
Filed May 12, 1966, Ser. No. 549,634
Claims priority, application Great Britain, May 19, 1965, 21,266/65
Int. Cl. G02f 7/00
U.S. Cl. 350—310                               5 Claims

ABSTRACT OF THE DISCLOSURE

A peripheral telescope mirror lining of alternate thermally insulating and conducting materials to provide uniform temperature distribution within the mirror substrate.

---

This invention relates to reflecting members for precision optical instruments, and particularly, though not exclusively, to telescope mirrors.

Thermal distortion in telescope mirrors can make such mirrors seriously defective especially near the edge of the mirror. Such thermal distortion taken place when a telescope mirror is subjected to a change in temperature, as will usually be the case when the telescope is in operation.

To reduce or eliminate such thermal distortion it is known to house the mirror in a thermally insulated cell. Such a cell must be capable of supporting the mirror and with large mirrors it is usually necessary to employ a steel structure to give the necessary support. As a result the cell structure has considerable thermal capacity and this can produce undesirable effects. An alternative approach is to apply heat to the mirror but this requires knowledge of external temperature conditions.

It is an object of the present invention to provide an improved reflecting member in which the above difficulties are eliminated or effectively reduced.

The present invention consists in a reflecting member for an optical instrument, which member includes at least one reflecting surface having edge portions surrounded by edge surfaces extending generally transversely to said reflecting surface, wherein thermal insulation is provided in contact with the said edge surfaces, the thermal properties and thickness of said thermal insulation being chosen so that isotherms in the body of the reflecting member, which extend in planes generally parallel to the reflecting surface, do not suffer any substantial change in direction near said edge portions and surfaces.

The insulation is preferably such that the propagation velocity of a temperature disturbance proceeding in a direction generally at right angles to the reflecting surface is approximately the same in both member and insulation.

The insulating material may be anisotropic and, in addition to having the aforementioned properties as regards propagation velocity, preferably has low thermal conductivity in a direction parallel to the reflecting surface. Generally speaking, the reflecting member is a circular mirror having a curved reflecting surface, and the said directions are radial directions transverse to the optical axis.

In the case of a glass mirror the thermal insulation may be in the form of at least one layer composed of glass fibres with the direction of the glass fibres generally parallel to the optical axis.

Alternatively, the insulation may take the form of successive layers of different insulating materials or comprise thermally insulating and thermally conducting layers to provide the required properties.

The invention will now be described with reference to the diagrammatic drawings in which.

Figure 1:
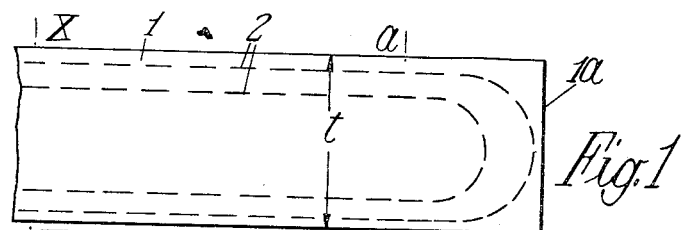
FIGURE 1 shows a typical distribution of isotherms in a telescope mirror during operation.

In carrying the invention into effect in the forms illustrated by way of example, and referring first to FIGURE 1, a telescope mirror 1 is shown of rectangular cross-section. The temperature distribution in the mirror during operation is such that the isotherms, some of which are indicated by dash lines 2, extend, in the main in planes generally transverse to the optical axis XX of the mirror. Near the edge of the mirror the isotherms suffer a change in direction so that they run in a direction parallel or approximately parallel to the edge surface 1a of the mirror as shown. As a result of this temperature distribution the mirror surfaces become distorted and take on a shape related to the shape of the isotherms themselves. The result is that the outer part of the mirror, that is the part at the right of a line aa, is often seriously defective.

Figure 2:
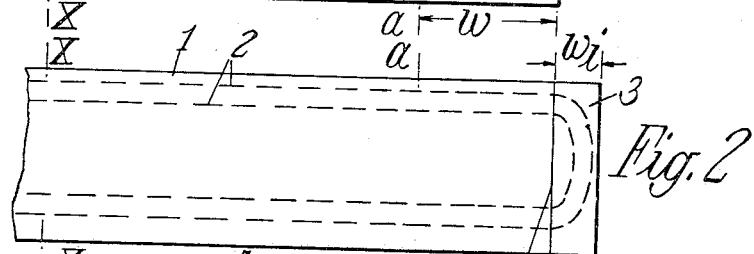
FIGURE 2 shows the distribution of isotherms when a thermally insulating layer in accordance with the invention is used.

By applying a thermal insulating layer 3 to the edge of the mirror as shown in FIGURE 2 the whole of the mirror surface can be made to remain substantially undistorted provided that the insulating layer is approximately equivalent in its thermal properties to the mirror material between line aa and the edge surface 1a of the mirror in FIGURE 1. The width w of the edge portion of glass approximates, in most cases, to the thickness t of the mirror. By using insulating material of conductivity considerably lower than that of the mirror material, for example a material such as expanded polystyrene, the isothermal surfaces remain substantially undistorted in the mirror even though in practice the width $w_1$ of the insulating layer may be less than the mirror thickness.

To obtain the smallest possible heat transfer across the boundary between mirror and insulation, and hence the least possible distortion of the isotherms near the said boundary, the propagation velocities for a temperature disturbance proceeding parallel to the optical axis XX of the mirror should be approximately the same in both mirror and insulation. The propagation velocity is proportional to the quantity $k/sc$ where $k$ is the thermal conductivity, $c$ the specific heat and $s$ the density, and it may often be possible to choose an insulating material in which $k$ is much lower than that of the mirror material but in which $c$ and $s$ are selected so as to give the same value of propagation velocity as the mirror material.

Higher insulating efficiency may be obtained by using an anisotropic insulating material to give the correct propagation velocity in the direction of the optical axis XX whilst maintaining a low conductivity in direction perpendicular or substantially perpendicular to the said axis XX. This can be achieved, in the case of a glass mirror for example, by using an insulating layer of expanded polystyrene as mentioned earlier, the thermal conductivity of which is of the order of 0.25 B.t.u. per inch thickness, per square foot, per hour per ° F. Alternatively a layer comprised of glass fibres may be used, the direction of the fibres being parallel or approximately parallel to the axis XX of the mirror.

Figure 3:
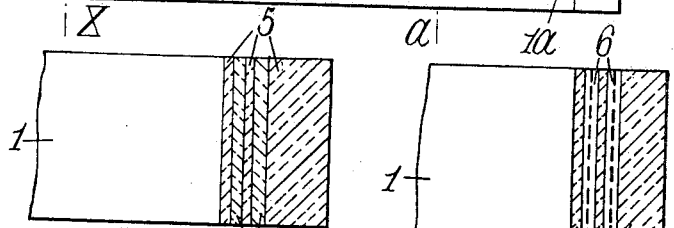
FIGURE 3 is a section through an edge portion of a telescope mirror showing thermal insulation in accordance with one form of the invention.

In a further possible arrangement, anisotropic insulation may consist of successive layers of different insulating material wrapped around the periphery of the mirror, or the insulation may consist of alternate thermally conducting layers as shown in FIGURE 3. The insulating layers are shown at 5 and the conducting layers at 6.

Figure 4:
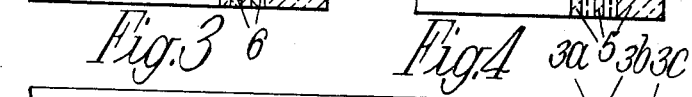
FIGURE 4 is a section through an edge portion of a telescope mirror showing an alternative form of thermal insulation according to the invention.

A suitable conducting material is aluminium or copper.

Where conducting layers are used it may be advantageous to break up the conducting layers 6 into disconnected rings in the direction of the optical axis as shown in FIGURE 4.

The effects of such an arrangement are:

(a) For radial directions the overall conductivity will be hardly effected since the layer is thin, but the propagation velocity will be reduced.

(b) For the axial direction the conductivity will be somewhat increased and the propagation velocity reduced.

(c) For the circumferential direction the conductivity will be greatly increased with probably an increase in propagation velocity.

Such a construction makes it possible to produce an insulating layer with any desired properties from a restrictive range of materials without any loss of efficiency, in fact the efficiency is likely to be much higher than any single material will give.

Figure 5:
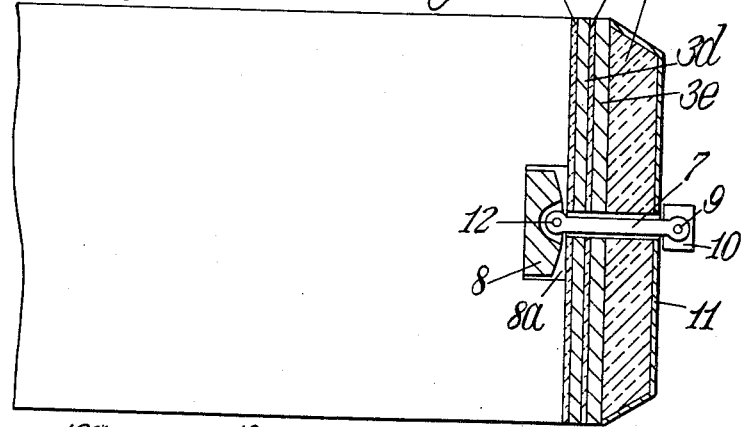
FIGURE 5 is a section through insulation of composite form, according to the invention, showing a radial support for the mirror.

In large telescope mirrors it is often necessary to provide radial support for the edge of the mirror and FIGURE 5 shows insulation adapted to allow for the passage of radial support arm 7. The arm 7 is hinged to a support block 8 housed in a groove 8a in the edge of mirror 1. The arm 7 passes through insulation 3 and terminates in hinge 9 which is surrounded by thermal insulation 10. Radial supporting forces are applied to the mirror through the radial arm 7 by members (not shown) hinged to the arm at hinge 9.

The insulation 3 comprises layers 3a, 3b, 3c of thermal insulating material, for example expanded polystyrene, whilst layers 3d and 3e are of thermally conducting material, for example abestos cloth with a proportion, say 8% by weight, of copper wire therein. Cover strip 11 may be of aluminium.

In a typical case for a given mirror 16" thick, the layers 3a and 3b are ¼" thick, the layer 3c is 2" thick, the layers 3d and 3e are ½" thick and the strip 11, ⅛" thick.

The support block 8 should be of a material having a coefficient of thermal expansion matching that of the glass. Invar steel could be used.

Figure 6:
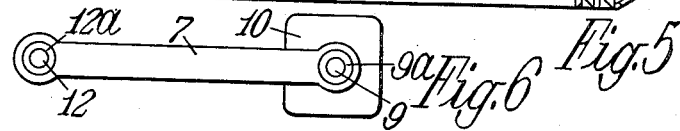
FIGURE 6 is an enlarged view of a radial support of FIGURE 5.

The radial arm 7 and hinge pins 9 and 12 may be of mild steel. The hinge pins are preferably in bushings 12a and 9a (FIGURE 6) of thermally insulating material such as a composite material of glass fibre and epoxy resin.

In general the layer of insulation is designed to give the following properties in the direction stated:

(a) Radial (transverse—low thermal conductivity to optical axis).

(b) Axial—Propagation velocity substantially equal to that of the mirror.

(c) Circumferential—High thermal conductivity.

I claim:

1. A mirror for a reflecting telescope, which mirror includes at least one reflecting surface having edge portions surrounded by edge surfaces extending generally transversely to said reflecting surface, in which mirror a layer of thermal insulation in the form of successive layers of thermally different material is provided in contact with the said edge surfaces, the layer being of sufficient thickness when considered in relation to its thermal conductivity to maintain in substantially parallel relationship to the reflecting surface, over the whole of the mirror surface including the said edge portions, isothermal surfaces which generally exist within the body of the mirror whilst the mirror is in operation due to changes in ambient temperature.

2. A mirror according to claim 1, in which the thermal insulation is in the form of successive layers of material built up outwardly from the said edge surfaces, some layers being of thermally insulating material and others being of thermally conducting material.

3. A mirror according to claim 1, in which the layer of thermal insulation is in the form of at least one layer composed of glass fibres, the direction of the glass fibres being generally transverse to the reflecting surface.

4. A mirror according to claim 1, in which the layer of thermal insulation is enclosed in a metal casing.

5. A mirror according to claim 1, having a curved reflecting surface, edge surfaces extending generally parallel to the optical axis of said mirror, and a thermally insulating layer in contact with the said edge surfaces.

References Cited

UNITED STATES PATENTS

| | | | |
|---|---|---|---|
| 3,063,343 | 11/1962 | Kaestner | 350—310 |
| 3,098,757 | 7/1963 | Libby | 350—288 |

OTHER REFERENCES

Thermal Conductivity, American Institute of Physics Handbook, second edition, McGraw-Hill, p. 4–99.

DAVID SCHONBERG, Primary Examiner

M. TOKAR, Assistant Examiner